United States Patent
Haga et al.

(10) Patent No.: US 11,776,499 B2
(45) Date of Patent: *Oct. 3, 2023

(54) DISPLAY DEVICE INCLUDING SUBPIXELS HAVING LIGHT-SHIELDED OPENING PORTIONS

(71) Applicant: Japan Display Inc., Tokyo (JP)

(72) Inventors: Yuta Haga, Tokyo (JP); Kazunari Tomizawa, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/075,437

(22) Filed: Dec. 6, 2022

(65) Prior Publication Data
US 2023/0097496 A1   Mar. 30, 2023

Related U.S. Application Data

(63) Continuation of application No. 17/319,087, filed on May 13, 2021, now Pat. No. 11,557,261, which is a continuation of application No. PCT/JP2019/039689, filed on Oct. 8, 2019.

(30) Foreign Application Priority Data

Nov. 13, 2018   (JP) ................................. 2018-213048

(51) Int. Cl.
*G02F 1/1335* (2006.01)
*G09G 3/30* (2006.01)
*G09G 3/36* (2006.01)
*G02F 1/1362* (2006.01)
*G02F 1/1368* (2006.01)

(52) U.S. Cl.
CPC ...... *G09G 3/3607* (2013.01); *G02F 1/133512* (2013.01); *G02F 1/1368* (2013.01); *G02F 1/13624* (2013.01); *G09G 2300/0452* (2013.01)

(58) Field of Classification Search
CPC ..................... G09G 3/3607; G09G 2300/0452
See application file for complete search history.

(56) References Cited

U.S. PATENT DOCUMENTS

| | | | | |
|---|---|---|---|---|
| 2017/0219895 A1* | 8/2017 | Yu | ........................ | G02F 1/13454 |
| 2017/0330500 A1* | 11/2017 | Yoon | ..................... | G09G 3/2007 |
| 2018/0088400 A1* | 3/2018 | Liu | .................... | G02F 1/136209 |
| 2018/0374401 A1* | 12/2018 | Yang | ..................... | G09G 3/3611 |

OTHER PUBLICATIONS

Indian Office Action dated Dec. 8, 2022, in IN Application No. 202117023313, 6 pages.

* cited by examiner

*Primary Examiner* — Sanghyuk Park
(74) *Attorney, Agent, or Firm* — XSENSUS LLP

(57) ABSTRACT

According to one embodiment, a display device includes a display panel including a plurality of pixels arranged in a non-rectangular display area, and a display controller configured to display images in the display area. An opening portion of each of pixels disposed at an edge portion of the display area is light-shielded at an area ratio according to a shape of the display area.

4 Claims, 10 Drawing Sheets

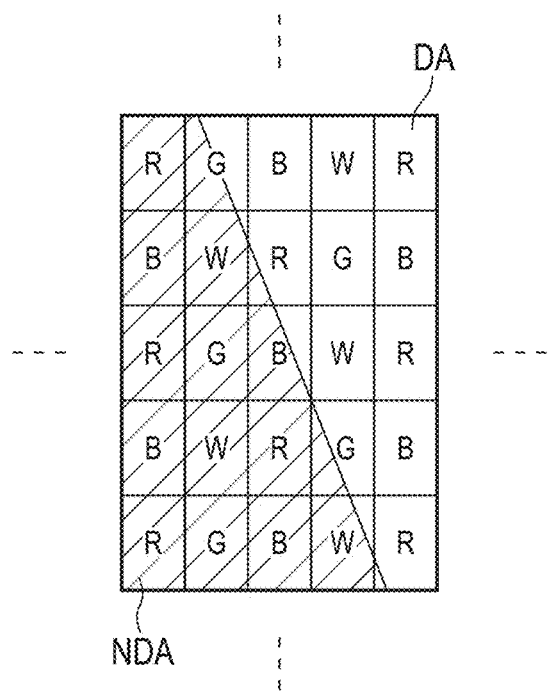
F I G. 10
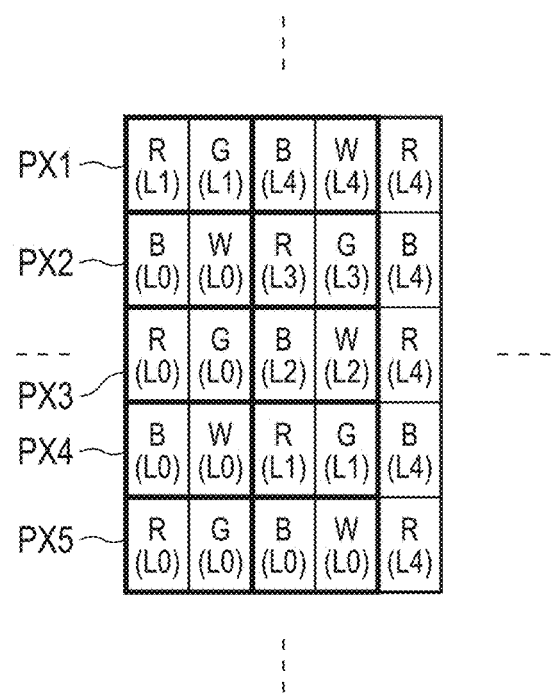
F I G. 11

DISPLAY DEVICE INCLUDING SUBPIXELS HAVING LIGHT-SHIELDED OPENING PORTIONS

CROSS-REFERENCE TO RELATED APPLICATIONS

This application is a continuation of U.S. patent application Ser. No. 17/319,087, filed May 13, 2021, which is a Continuation Application of PCT Application No. PCT/JP2019/039689, filed Oct. 8, 2019 and based upon and claiming the benefit of priority from Japanese Patent Application No. 2018-213048, filed Nov. 13, 2018, the entire contents of all of which are incorporated herein by reference.

FIELD

Embodiments described herein relate generally to a display device.

BACKGROUND

In a display device, various images are displayed on a display area of the display device (a display panel).

The shape of the display area of such a display device is generally rectangular, but in recent years, display devices including display areas of various shapes other than rectangular have been developed.

However, depending on the shape of the display area described above, rattling or the like may be noticeable at an edge of the display area.

BRIEF DESCRIPTION OF THE DRAWINGS

FIG. 10 is a diagram showing a boundary portion between a non-rectangular display area and a non-display area.

FIG. 11 is a diagram illustrating opening portions of respective subpixels included in pixels disposed at an edge of the display area.

FIG. 14 is a diagram showing the edge portion of the display area when the size of the openings is adjusted in units of two subpixels.

FIG. 15 is a diagram showing another example of the pixel array.

FIG. 16 is a diagram showing still another example of the pixel array.

DETAILED DESCRIPTION

Figure 1:
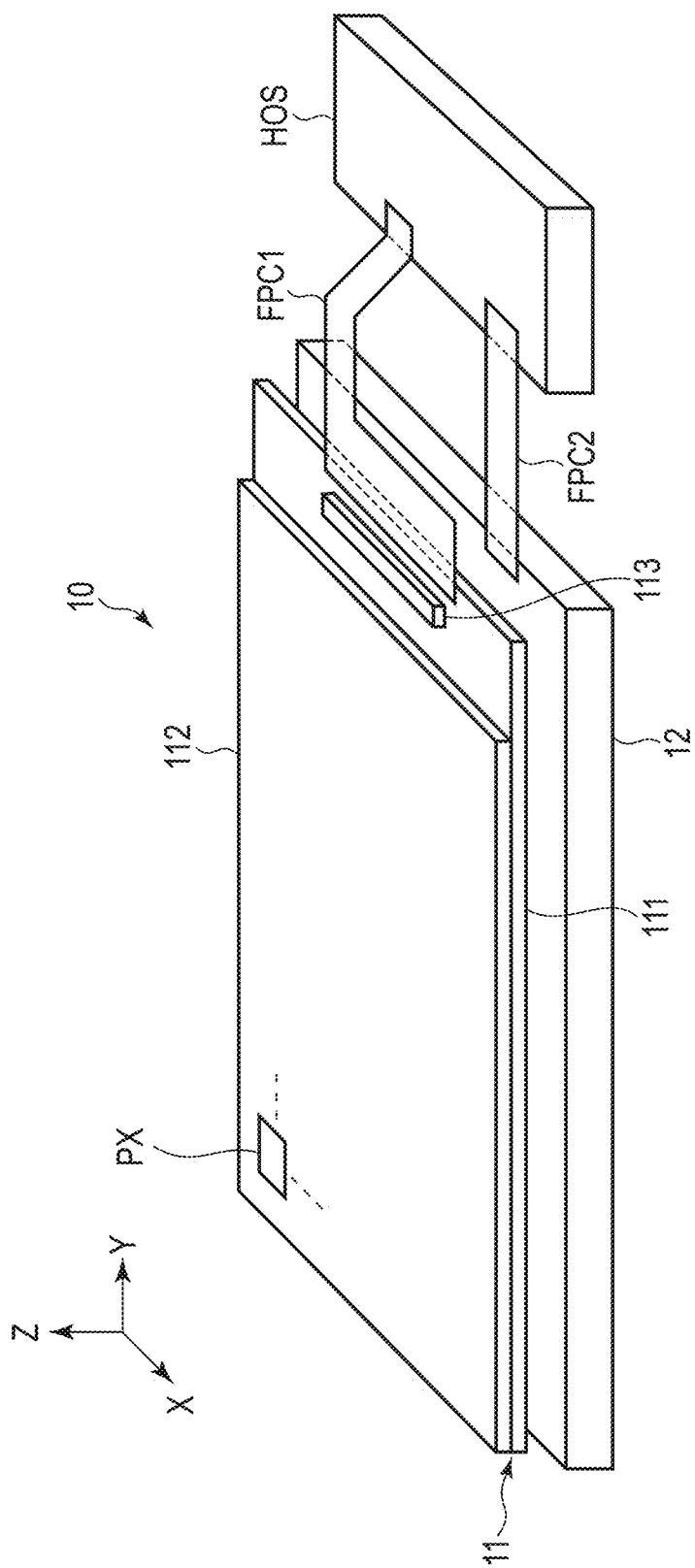
FIG. 1 is a perspective view schematically showing a configuration of a display device according to the first embodiment.

In general, according to one embodiment, a display device includes a display panel including a plurality of pixels arranged in a non-rectangular display area, and a display controller configured to display images in the display area. An opening portion of each of pixels disposed at an edge portion of the display area is light-shielded at an area ratio according to a shape of the display area.

Various embodiments will be described hereinafter with reference to the accompanying drawings.

The disclosure is a mere example, and arbitrary change of gist which can be easily conceived by a person of ordinary skill in the art naturally falls within the inventive scope. To more clarify the explanations, the drawings may pictorially show width, thickness, shape and the like, of each portion as compared with an actual aspect, but they are mere examples and do not restrict the interpretation of the invention. In each drawing, reference numerals may be omitted for the same or similar elements arranged consecutively. In the present specification and drawings, elements like or similar to those in the already described drawings may be denoted by similar reference numbers and their redundant detailed descriptions may be arbitrarily omitted.

First Embodiment

FIG. 1 is a perspective view schematically showing a configuration of a display device according to the present embodiment. FIG. 1 shows a three-dimensional space defined by a first direction X, a second direction Y perpendicular to the first direction X, and a third direction Z perpendicular to the first direction X and the second direction Y. Note that the first direction X and the second direction Y are orthogonal to each other, but they may intersect at an angle other than 90°. Further, in the description of FIG. 1, the third direction Z is defined as an upper side, and a direction opposite to the third direction Z is defined as a lower side. With such expressions "a second member above a first member" and "a second member below a first member", they are meant that the second member may be in contact with the first member or may be separated from the first member.

Hereinafter, the embodiments will be described in connection with an example case where the display device is a liquid crystal display device which employs a liquid crystal layer, but the display device may be an organic electroluminescence (EL) display device using an organic light-emitting layer or an LED display device employing a light-emitting diode (LED).

The display device 10 shown in FIG. 1 includes a display panel 11. For example, the display panel 11 has a rectangular shape. In the example illustrated, short sides of the display panel 11 are parallel to the first direction X, and long sides of the display panel 11 are parallel to the second direction Y. The third direction Z corresponds to a thickness direction of the display panel 11. A main surface of the display panel 11 is parallel to an X-Y plane defined by the first direction X and the second direction Y.

The display panel 11 includes a first substrate (an array substrate) 111, a second substrate (counter-substrate) 112 disposed to oppose the first substrate 111 and a liquid crystal layer (not shown) formed between the first substrate 111 and the second substrate 112. Note that a panel driver (a display controller) 113 that drives the display panel 11 is mounted on, for example, the first substrate 111.

Further, although not shown in FIG. 1, the display panel 11 includes a display area, which is an area for displaying images. In the display area, a plurality of pixels PX are arranged (arrayed).

Furthermore, for example, a host device HOS is provided on an outer side of the display panel 11, and the host device HOS is connected to the display panel 11 via a flexible printed circuit board FPC1 and a panel driver 113.

The panel driver 113 inputs image signals output from the host device HOS, and thus displays images on the display panel 11 by driving the pixels PX based on the image signals.

On a lower side of the first substrate 111 (that is, a rear surface side of the display panel 11), a backlight unit 12 (an illumination device) that irradiates white light onto the display panel 11 is arranged. A flexible printed circuit board FPC2 connects the backlight unit 12 and the host device HOS to each other. As the backlight unit 12, various types can be utilized, and as the light source, there are a light source which employs a light-emitting diode (LED), a light source which employs a cold-cathode fluorescent tube (CCFL), and the like.

Here, the case of employing the backlight unit 12 arranged on the rear surface side of the display panel 11 has been described, but a front light arranged on a display surface side of the display panel 11 may be used. Further, in place of the backlight unit 12, an illuminating device which employs a light guide and an LED or a cold-cathode fluorescent tube arranged on the side thereof may be used, or an illuminating device which employs a dotted light source in which light emitting elements are arranged in a plane may be used. Note that when the display device 10 is an organic EL display device or an LED display device, the display device 10 may be of a structure without an illumination unit corresponding to the backlight unit 12.

Further, the display panel 11 in the present embodiment may be any of a transmissive type, a reflective type and a transflective type. The display device 10 to which the transmissive display panel 11 is applied includes the backlight unit 12 on the rear surface side of the first substrate 111 as described above, and has a transmissive display function which displays images by selectively transmitting the light from the backlight unit 12. The display device 10 to which the reflective display panel 11 is applied has a reflective layer that reflects light on the rear surface side of the display panel 11 with respect to the liquid crystal layer, and has a reflective display function which displays images by selectively reflecting the light from a front surface side (a display surface side) of the second substrate 112. Note that an auxiliary light source may be provided on the front surface side of the reflective display panel 11. Further, the reflective layer may be formed of a material having a reflective function such as metal so as to form an electrode on the rear surface side of the display panel 11 with respect to the liquid crystal layer. The display device 10 to which the transflective display panel 11 is applied has the transmissive display function and reflective display function described above.

Figure 2:
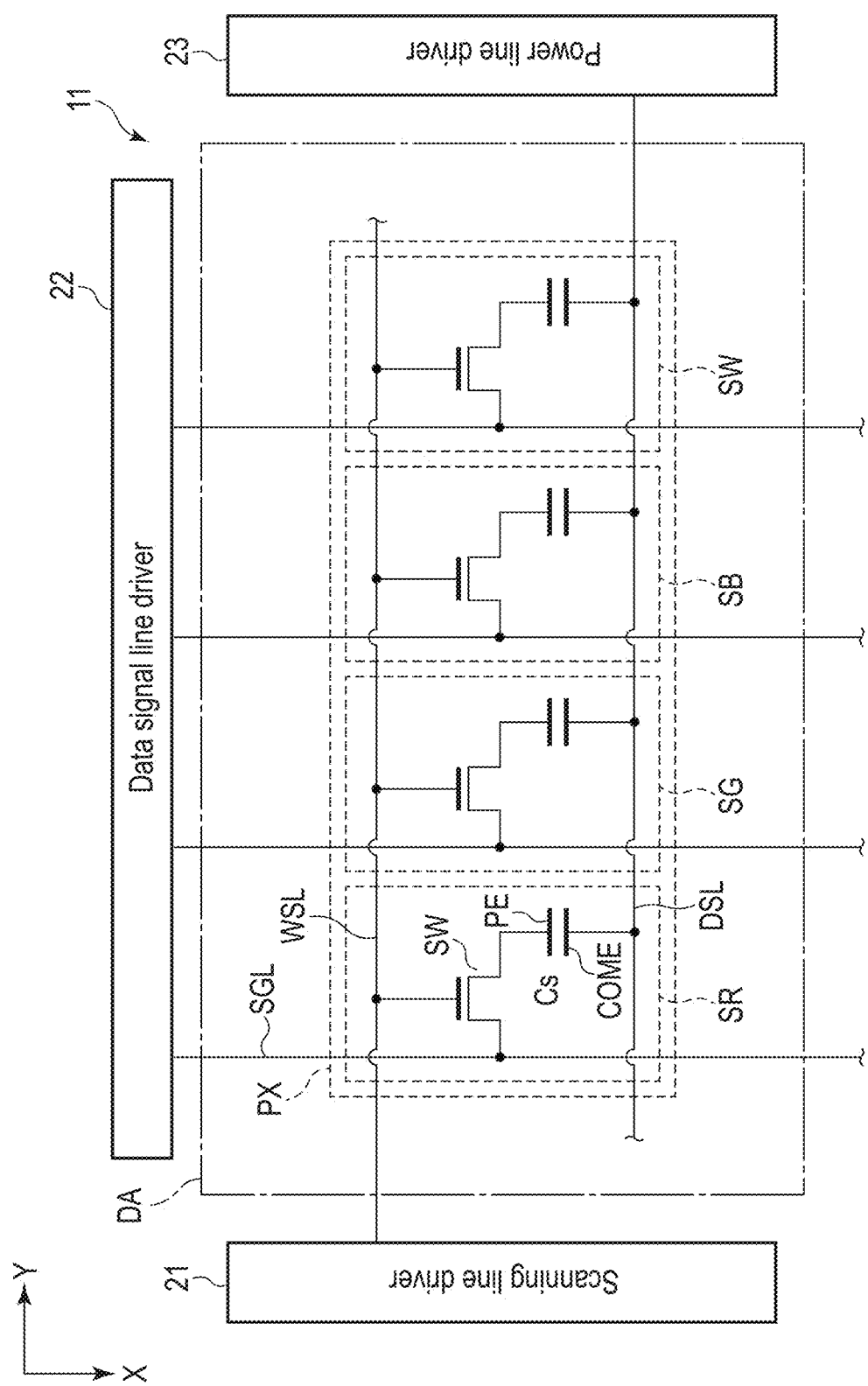
FIG. 2 is a diagram showing an example of a circuit configuration of a display panel.

FIG. 2 shows an example of a circuit configuration of the display panel 11 shown in FIG. 1. As shown in FIG. 2, the display panel 11 includes a scanning line driver 21, a data signal line driver 22, and a power line driver 23.

Here, as described above, a plurality of pixels PX are arranged in the display panel 11 (the display area DA). In FIG. 2, for the sake of convenience, only one of the pixels PX is shown. Similarly, in FIG. 2, for the sake of convenience, only a part of the display area DA in which one pixel PX is disposed is shown. Note that the details of the arrangement (the pixel array) of the pixels PX and the display area DA in this embodiment will be described later.

In this embodiment, each pixel PX includes, for example, four subpixels SR, SG, SB and SW. The subpixel SR is a subpixel that outputs light corresponding to a red wavelength band (that is, red component light). The subpixel SG is a subpixel that outputs light corresponding to a green wavelength band (that is, green component light). The subpixel SB is a subpixel that outputs light corresponding to a blue wavelength band (that is, blue component light). The subpixel SW is a subpixel that outputs light corresponding to a white wavelength band (white component light). In the pixel PX, the subpixels SR, SG, SB and SW are arranged along, for example, a row direction (the second direction Y).

In the display panel 11, a plurality of scanning lines WSL extending along the row direction of the plurality of pixels PX, a plurality of power supply lines DSL extending in parallel with the plurality of scanning lines WSL, and a plurality of data signal lines SGL extending along a column direction (the first direction X) of the plurality of pixels PX are further disposed. One end of each scanning line WSL is connected to the scanning line driver 21. One end of each data signal line SGL is connected to the data signal line driver 22. One end of each power supply line DSL is connected to the power supply line driver 23.

The above-described subpixels SR, SG, SB and SW are respectively displaced at intersections of the respective scanning lines WSL and the respective data signal lines SGL.

Here, the configuration of the subpixel SR will be described. As shown in FIG. 2, the subpixel SR includes a pixel switch SW. The pixel switch SW includes a thin film transistor (TFT). A gate electrode of the pixel switch SW is electrically connected to the corresponding scanning line SWL. One of a source electrode and a drain electrode of the pixel switch SW is electrically connected to the corresponding signal line SGL. The other of the source electrode and the drain electrode of the pixel switch SW is connected to the corresponding pixel electrode PE.

Note that the scanning line driver 21 applies an on-voltage to the scanning line WSL and supplies the on-voltage to the gate electrode of the pixel switch SW electrically connected to the scanning line WSL. Thus, conduction is established between the source electrode and the drain electrode of the pixel switch SW in which the on-voltage is supplied to the gate electrode.

The data signal line driver 22 supplies an output signal (image signal) corresponding to each of the signal lines SGL. The signal supplied to the signal line SGL is applied to the corresponding pixel electrode PE via the pixel switch SW in which the source electrode and the drain electrode are electrically connected.

The power supply line driver 23 supplies a drive signal (applies a drive voltage) to the common electrode COME. The pixel electrode PE and the common electrode COME described above are arranged so as to oppose each other via an insulating film. The pixel electrode PE, the common electrode COME and the insulating film form a storage capacitor CS.

Here, the configuration has been described in connection with the subpixel SR, and the other subpixels SG, SB and SW have a configuration similar thereto.

Note that the scanning line driver 21, the data signal line driver 22 and the power supply line driver 23 are disposed on an edge region (a frame) of the display panel 11, and are controlled by the panel driver 113 described above. Although not shown, the panel driver 113 controls the operation of the backlight unit 12.

Although only one scanning line driver 21 is shown in FIG. 2, the display panel 11 may be configured to include a plurality of scanning line drivers 21. For example, when two scanning line drivers 21 are provided, it can be configured such that a part of the plurality of scanning lines WSL is connected to one scanning line driver 21 and the rest is connected to the other scanning line driver 21. Note that the two scanning line drivers 21 are provided, the scanning line drivers 21 are arranged so as to oppose each other while interposing the plurality of pixels PX therebetween.

Although a relatively simple circuit configuration (pixel circuit) has been described with reference to FIG. 2, the display panel 11 in this embodiment may have some other circuit configuration.

Figure 3:
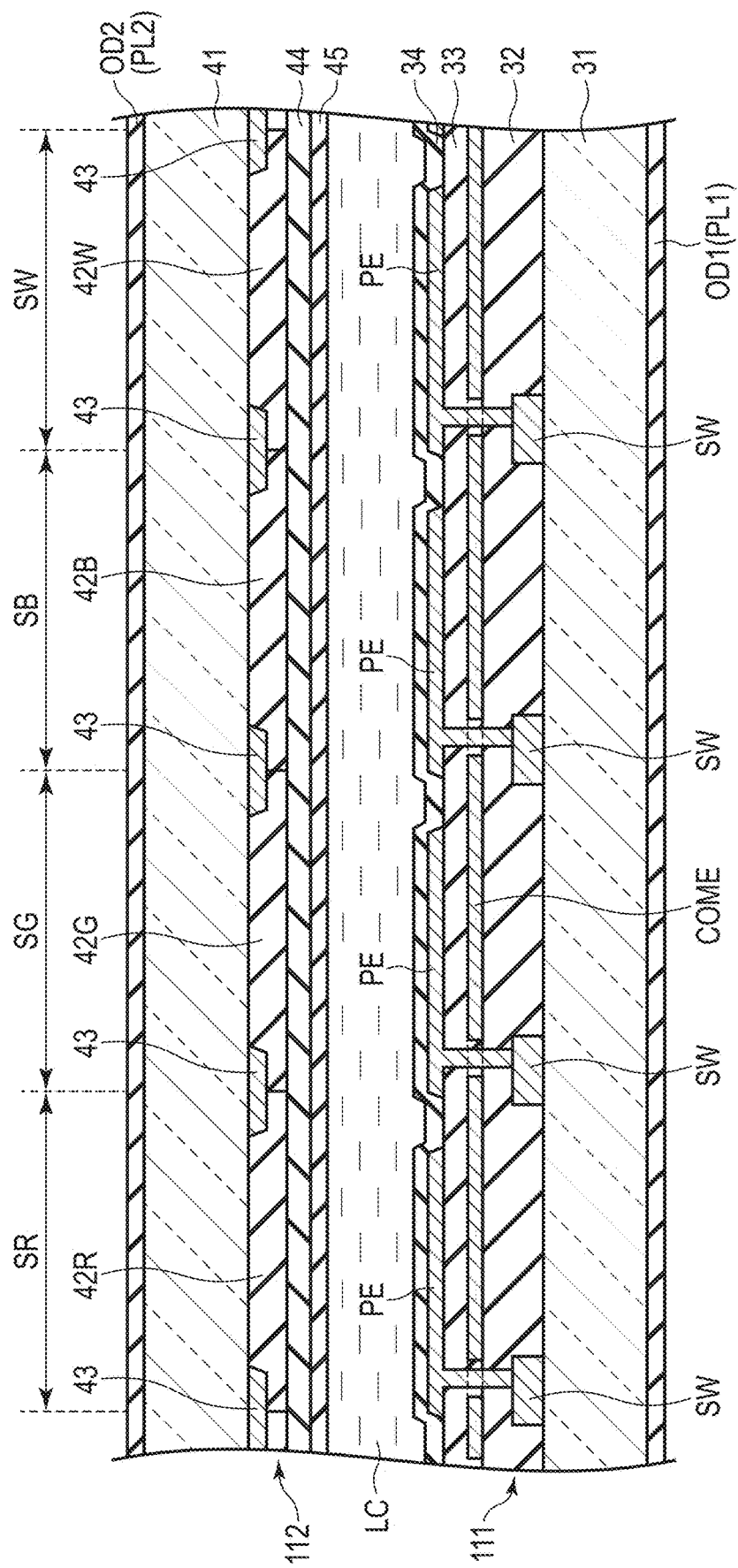
FIG. 3 is a diagram showing an example of a cross-sectional structure of the display panel.

FIG. 3 shows an example of a sectional structure of the display panel 11. In FIG. 3, for the sake of convenience, only a cross section (that is, a part of the cross section of the display panel 11) of the subpixels SR, SG, SB, and SW included in one pixel PX along the second direction Y is shown.

The first substrate 111 includes a first insulating substrate 31 such as of a glass or resin substrate having light transmitting property. The first substrate 111 also includes a switching element SW, a pixel electrode PE, a common electrode COME, a first insulating layer 32, a second insulating layer 33 and a first alignment film 34.

The switching element SW is disposed in each of the subpixels SR, SG, SB and SW. The switching element SW is provided on a surface of the first insulating substrate 31, which opposes the second substrate 112, and is covered with the first insulating layer 32.

Note that, in FIG. 3, the scanning line WSL, the power supply line DSL, the data signal line SGL and the like are omitted. Further, in FIG. 3, the switching element SW is illustrated in a simplified manner. Specifically, the first insulating layer 32 includes a plurality of layers, and the switching element SW includes a semiconductor layer and various electrodes formed in the layers.

In the example shown in FIG. 3, one pixel electrode PE is provided for each of the subpixels SR, SG, SB and SW, and a common electrode COME is provided over the subpixels SR, SG, SB and SW. The common electrode COME is formed on the first insulating layer 32. As shown in FIG. 3, the common electrode COME is formed so as to open at positions opposing the respective pixel electrodes PE. The common electrode COME is covered by the second insulating layer 33.

The pixel electrode PE is formed on the second insulating layer 33 and opposes the common electrode COME. Each pixel electrode PE is electrically connected to the switching elements SW of the subpixels SR, SG, SB and SW, respectively. The pixel electrode PE and the common electrode COME can be formed of a transparent conductive material such as indium tin oxide (ITO).

The first alignment film 34 covers the pixel electrode PE and is in contact with the liquid crystal layer LC. The first alignment film 34 is subjected to an alignment process such as a rubbing process or a photo alignment process.

On the other hand, the second substrate 112 includes a second insulating substrate 41 such as a glass or resin substrate having light transmitting property.

The second substrate 112 also includes filter layers 42R, 42G, 42B and 42W at positions corresponding to the subpixels SR, SG, SB and SW, respectively. The filter layers 42R, 42G, 42B and 42W are provided on a surface of the second insulating substrate 41, which opposes the first substrate 111.

Note that the subpixel SR is a subpixel that outputs light corresponding to the red wavelength band (that is, displays red), the filter layer 42R includes a red color filter. Similarly, the subpixel SG is a subpixel that outputs light corresponding to the wavelength band of green (that is, displays green), the filter layer 42G includes a green color filter. The subpixel SB is a subpixel that outputs light corresponding to the blue wavelength band (that is, displays blue), the filter layer 42B includes a blue color filter. The subpixel SW is a subpixel that outputs light corresponding to the white wavelength band (that is, displays white), the filter layer 42W may be, for example, a transparent filter or the like.

Further, the second substrate 112 includes a light-shielding layer (a black matrix) 43, an overcoat layer 44 and a second alignment film 45.

The light-shielding layer 43 is arranged at a boundary between the subpixels SR, SG, SB and SW in a plan view from a direction perpendicular to the first substrate 111 and the second substrate 112 described above. More specifically, the light-shielding layer 43 is disposed so as to overlap the scanning line WSL, the power supply line DSL and the data signal line SGL described above, and to partition each subpixel SR, SG, SB and SW.

In the display device 10, various images are displayed by outputting light from portions (opening portions) of the pixels PX (subpixels SR, SG, SB and SW), which do not overlap the light-shielding layer 43. Note that, for example, when a pixel PX is arranged in a region other than the display area DA(, which will be referred to as a non-display area hereinafter), the light-shielding layer 43 is arranged at a position overlapping the pixel PX and thus the display area DA can be formed.

The overcoat layer 44 covers the filter layers 42R, 42G, 42B and 42W and planarizes surfaces of the filter layers 42R, 42G, 42B and 42W.

The second alignment film 45 covers the overcoat layer 44 and is in contact with the liquid crystal layer LC. As in the case of the first alignment film 34, the second alignment film 45 is subjected to an alignment process such as a rubbing process or a photo alignment process.

Note that a first optical element OD1, which includes a first polarizer PL1 is disposed on a surface of the first insulating substrate 31, opposite to a side opposing the second substrate 112. Further, a second optical element OD2, which includes a second polarizer PL2 is disposed on a surface of the second insulating substrate 41, opposite to a side opposing the first substrate 111. A first polarization axis (or a first absorption axis) of the first polarizer PL1 and a second polarization axis (or a second absorption axis) of the second polarizer PL2 are in a cross-Nicol relationship, which is orthogonal to each other.

Figures 4, 5:
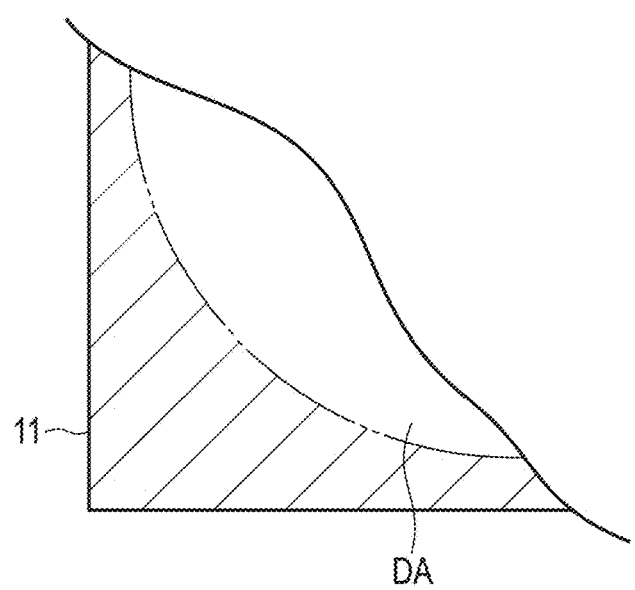
FIG. 4 is a diagram illustrating an example of a pixel array.
FIG. 5 is a diagram specifically showing a non-rectangular display area.

Here, with reference to FIG. 4, the pixel array in this embodiment will be described. FIG. 4 simply shows an array of a plurality of pixels PX arranged on the display panel 11 in this embodiment.

In this embodiment, each of the pixels PX arranged on the display panel 11 includes a plurality of subpixels SR, SG, SB and SW as described above. Blocks arranged in a matrix in FIG. 4 each represent a subpixel included in each pixel PX. Further, a block labeled "R" represents the subpixel SR, a block labeled "G" represents the subpixel SG, a block labeled "B" represents the subpixel SB, and a block labeled "W" represents the subpixel SW. The same applies to the following drawings.

In the pixel array according to this embodiment, for example, a plurality of pixels PX including subpixels SR, SG, SB and SW arranged along the row direction are arranged side by side along the row direction, and rows constituted by such a plurality of pixels PX are arranged side by side along a column direction.

Further, as shown in FIG. 4, in the pixel array in this embodiment, a plurality of pixels PX (subpixels SR, SG, SB and SW) are arranged so that subpixels SR, SG, SB and SW respectively form a stripe shape along the column direction. In other words, the pixels PX which constitute the respective rows of the pixel array are arranged such that the subpixels that output light corresponding to the wavelength band of the same color are adjacent to each other along the column direction.

According to the configuration in which each pixel PX includes the subpixels SR, SG, SB and SW as described above, the area transmitting light is increased and thus the brightness can be improved as compared to, for example, the configuration in which each pixel PX includes the subpixels SR, SG and SB. Therefore, it is possible to suppress the power consumption of the backlight unit 12, for example.

Here, the shape of the display area DA described above is generally rectangular, but in this embodiment, it is assumed that the display area DA is formed into a non-rectangular shape. More specifically, as shown in FIG. 5, it is assumed that the display area DA is formed to have a rounded shape (round shape) at corners or the like, of the display panel 11, for example.

Note that it suffices if the display area DA in this embodiment is non-rectangular. That is, the display area DA may be formed to have, for example, a circular shape as a whole, in addition to the one having a partially round shape as shown in FIG. 5. Or, it may be formed in a shape having a side extending in a direction other than the direction orthogonal to or parallel to the row direction or the column direction in the pixel array described above.

Figure 6:
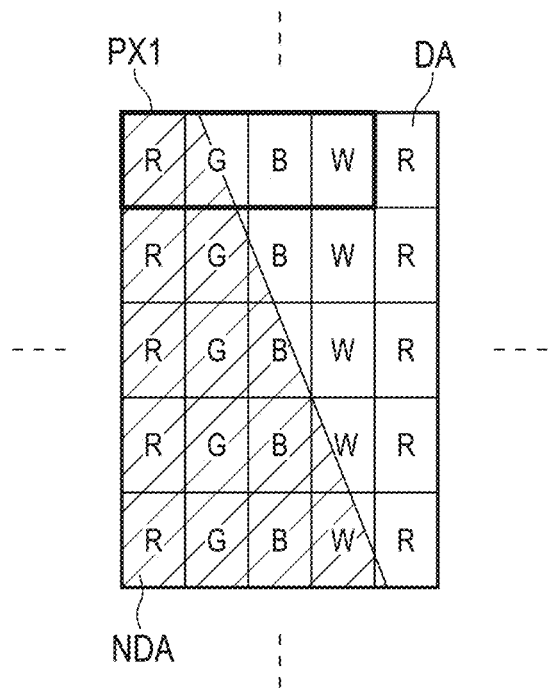
FIG. 6 is a diagram illustrating a boundary portion between the non-rectangular display area and a non-display area.

Here, in order to form a non-rectangular display area DA shown in FIG. 6 in the pixel array shown in FIG. 4 described above, such a configuration will be assumed that the light-shielding layer 43 is provided at a position overlapping the non-display area NDA of the pixels PX (subpixels SR, SG, SB and SW) (that is, the portion corresponding to the non-display area NDA is covered by the light-shielding layer 43). Note that FIG. 6 is an enlarged view of a part of the boundary portion between the display area DA and the non-display area NDA in the area in which the plurality of pixels PX are arranged.

In the case of such a configuration, for example, in a pixel PX1 shown in FIG. 6, the subpixel SR and subpixel SG of the subpixels SR, SG, SB and SW are partially covered by the light-shielding layer 43, whereas the other portion of the subpixel SG and the subpixels SB and SW are not covered by the light-shielding layer 43. When displaying white, for example, in such a pixel PX1, it is not possible to display an appropriate color to be displayed in the pixel PX1, because at least the red component and the green component are insufficient in the pixel PX1. That is, in the configuration in which the light-shielding layer 43 is simply provided at a position overlapping with the non-display area NDA to form the display area DA, a phenomenon occurs in which an uneven hue is visually recognized at an edge of the display area DA (hereinafter, referred to as coloring).

On the other hand, in order to avoid the coloring described above, for example, a configuration in which the light-shielding layer 43 is provided in all regions of the pixel PX1 (subpixels SR, SG, SB and SW) can be considered. However, with such a configuration, rattling is visually noticeable at an edge portion of the display area DA.

Therefore, in this embodiment, each of the openings of the pixels PX disposed at an edge portion of the display area DA is formed into a size corresponding to the shape of the display area DA. Note that in this embodiment, the openings of the pixel PX (subpixels SR, SG, SB and SW) is a portion (area) that does not overlap the light-shielding layer 43 of the pixel PX and is also a part where the light output from the pixel PX can be visually recognized. Further, for example, the area of at least one of the subpixels SR, SG, SB and SW (for example, the subpixel SW) included in the pixel PX may be different from that of the other subpixels. In such a case, the expression "each of the openings of the pixel PX (subpixels SR, SG, SB and SW) is formed into a size corresponding to the shape of the display area DA" includes the meaning of that the opening is shielded at an area ratio corresponding to the shape of the display area DA.

Hereinafter, with reference to FIG. 7, the openings of the pixels PX (subpixels SR, SG, SB and SW) disposed at an edge portion of the display area DA when that shown in FIG. 6 in this embodiment is realized, will be described.

Figure 7:
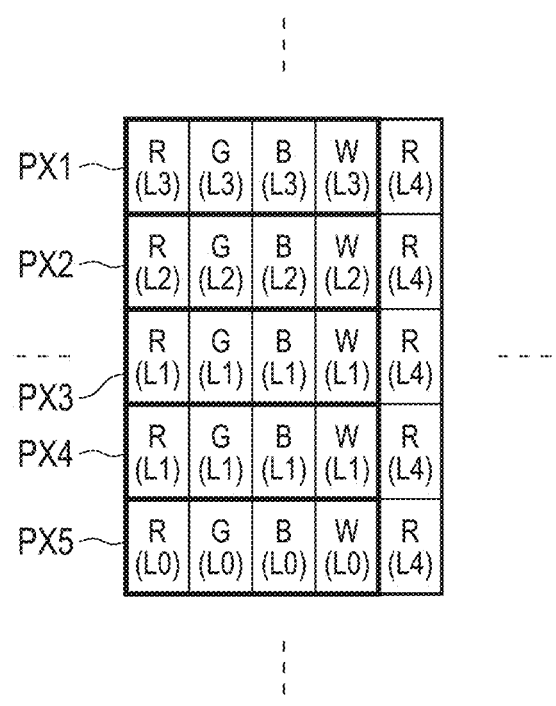
FIG. 7 is a diagram illustrating opening portions of respective pixels disposed at an edge portion of the display area.

Here, FIG. 7 shows pixels PX1 to PX5, and reference symbols L0 to L4 noted in the blocks representing the subpixels included in each of the pixels PX1 to PX5 each indicate an aperture ratio of the respective one of the subpixels. Note that the aperture ratio of a subpixel is, for example, a ratio of the size of the opening of the subpixel to the maximum size of the opening of the subpixel, and is used to represent the size of the opening.

More specifically, L0 indicates that the aperture ratio of the subpixel represented by the block in which the L0 is noted is 0%. In other words, L0 indicates that the light-shielding layer 43 is provided at a position overlapping the subpixel so that the light for displaying images is not output from all regions of the subpixel represented by the block in which L0 is noted.

L1 indicates that the aperture ratio of the subpixel represented by the block in which the L1 is noted is 25%. In other words, L1 indicates that the light-shielding layer 43 is provided at a position overlapping 75% of the region of the subpixel so that the light for displaying images is output from 25% of the region of the subpixel represented by the block in which L1 is noted.

L2 indicates that the aperture ratio of the subpixel represented by the block in which the L2 is noted is 50%. In other words, L2 indicates that the light-shielding layer 43 is provided at a position overlapping 50% of the region of the subpixel so that the light for displaying images is output from 50% of the region of the subpixel represented by the block in which L2 is noted.

L3 indicates that the aperture ratio of the subpixel represented by the block in which the L2 is noted is 75%. In other words, L3 indicates that the light-shielding layer 43 is provided at a position overlapping 25% of the region of the subpixel so that the light for displaying images is output from 75% of the region of the subpixel represented by the block in which L3 is noted.

L4 indicates that the aperture ratio of the subpixel represented by the block in which the L4 is noted is 100%. In other words, only a minimum required light-shielding layer 43 (that is, the light-shielding layer 43 which partitions the area into the subpixel from the other surrounding subpixels) is provided at a position overlapping the subpixel so that the light for displaying images is output from all regions of the subpixel represented by the block in which the L4 is noted.

Note that in the example shown in FIG. 7, L3 is noted in each of the blocks respectively representing the subpixels SR, SG, SB and SW included in the pixel PX1. This shows that the pixel PX1 has an aperture ratio of 75%.

Further, L2 is noted in each of the blocks respectively representing the subpixels SR, SG, SB and SW included in the pixel PX2. This shows that the pixel PX2 has an aperture ratio of 50%.

Moreover, L1 is noted in each of the block respectively representing the subpixels SR, SG, SB and SW included in the pixel PX3. This shows that the pixel PX3 has an aperture ratio of 25%.

Similarly, L1 is noted in each of the blocks respectively representing the subpixels SR, SG, SB and SW included in the pixel PX4. This shows that the pixel PX4 has an aperture ratio of 25%.

Further, L0 is noted in each of the blocks respectively representing the subpixels SR, SG, SB and SW included in the pixel PX5. This shows that the pixel PX5 has an aperture ratio of 0%.

As described above, in this embodiment, the aperture ratio is set per each pixel PX, and the subpixels SR, SG, SB and SW included in the same pixel PX are formed to have the same aperture ratio (opening size).

Further, the aperture ratios of the pixels PX adjacent to the right side of the pixels PX1 to PX5 shown in FIG. 7 (that is, the pixels PX arranged at locations other than the edge portion of the display area DA) are each 100% (L4). That is, in this embodiment, it is designed that the size of each opening of the pixels PX disposed at the edge portion of the display area DA is less than or equal to the size of each opening of the pixels PX arranged in the display area DA other than the edge portions.

Here, in this embodiment, the light-shielding layer 43 is provided (mounted) at a position overlapping the pixels PX1 to PX5 so that the opening of each of the pixels PX1 to PX5 disposed at the edge portion of the display area DA has a size corresponding to the shape (outline) of the display area DA. Here, the size of the opening (that is, the aperture ratio) is determined, for example, as follows.

First, let us suppose that an area where a plurality of pixels PX are arranged as shown in FIG. 6 above is divided into a display area DA and a non-display area NDA. Then, the ratio occupied by the display area DA that overlaps the region with respect to the region of each pixel PX (, which will be referred to as the display area ratio of the pixel PX, hereinafter) is specified.

If the display area ratio of a pixel PX thus specified is, for example, 0% to 12.5%, the aperture ratio of the pixel PX is set to 0% (that is, L0).

When the display area ratio of the pixel PX is, for example, 12.5t to 37.5%, the aperture ratio of the pixel PX is set to 25% (that is, L1).

When the display area ratio of the pixel PX is, for example, 37.5% to 62.5%, the aperture ratio of the pixel PX is set to 50% (that is, L2).

When the display area ratio of the pixel PX is, for example, 62.5% to 87.5%, the aperture ratio of the pixel PX is set to 75% (that is, L3).

When the display area ratio of the pixel PX is, for example, 87.5% to 100%, the aperture ratio of the pixel PX is set to 100% (that is, L4).

Specifically, when the area where a plurality of pixels PX are arranged is divided into the display area DA and the non-display area NDA shown in FIG. 6, the display area ratio of the pixel PX1 is applicable to 62.5% to 87.5%. Therefore, the aperture ratio of the pixel PX1 is set to 75% (L3).

Further, the display area ratio of the pixel PX2 is applicable to 37.5% to 62.5%, the aperture ratio of the pixel PX2 is set to 50% (L2). Similarly, the display area ratio of the pixels PX3 and PX4 is applicable to 12.5% to 37.5%, the aperture ratio of the pixels PX3 and PX4 is set to 25% (L1). Further, the display area ratio of the pixel PX5 is applicable to 0% to 12.5%, the aperture ratio of the pixel PX5 is set to 0% (L0).

As described above, in this embodiment, the size (aperture ratio) of each opening of the pixels PX disposed at the edge portion of the display area DA is determined according to the shape (outline) of the display area DA. Thus, the light-shielding layer 43 can be mounted (that is, the opening is formed) at a position overlapping the pixel PX so that the opening has the determined size.

The correspondence between the display area ratio and the aperture ratio in each case described above is an example. For example, when the display area ratio is 0% to 33.3%, the aperture ratio may be set to 0%, when the display area ratio is 33.3% to 66.7%, the opening ratio may be set to 50%, and when the display area ratio is 66.7% to 100%, the opening ratio may be set to 100%. That is, the correspondence between the display area ratio and the aperture ratio may be changed appropriately. In addition, the correspondence between the display area ratio and the aperture ratio may be determined according to, for example, the performance of the display device 10 (for example, the number of pixels, the pixel arrangement or the like).

Further, this embodiment is described as provided above in connection with the case where the aperture ratio of the pixel PX is determined based on the display area ratio of each pixel PX. But, for example, the aperture ratio of the PX pixel may be set based on the non-display area ratio of the pixel PX (that is, the ratio occupied by the non-display area NDA that overlaps the region with respect to the region of the pixel PX).

Further, the aperture ratio of each pixel PX may be determined from a viewpoint other than the display area ratio and non-display area ratio described above.

Figures 8, 9:
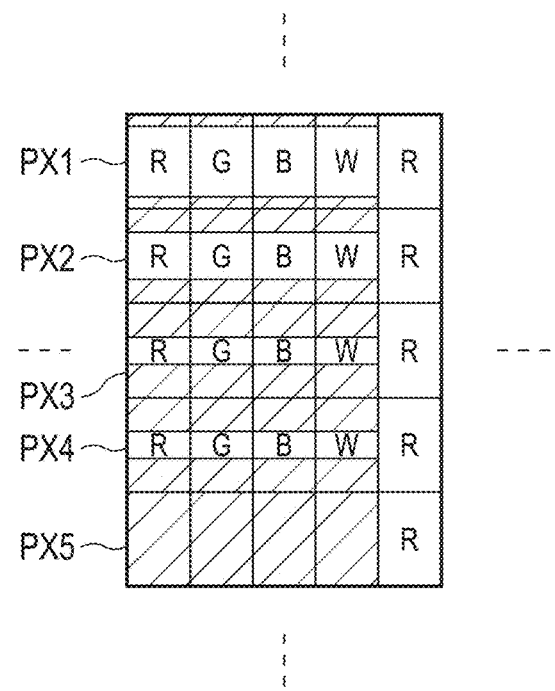
FIG. 8 is a diagram specifically showing the opening portions of the respective pixels.
FIG. 9 is a diagram illustrating an example of a pixel array in the second embodiment.

Here, FIG. 8 specifically shows the opening portions of the respective pixels PX1 to PX5 formed according to the aperture ratios of the respective pixels PX1 to PX5 illustrated in FIG. 7. Note that, in FIG. 8, the shaded portions indicate the portions where the light-shielding layer 43 is provided, and the portions where the light-shielding layer 43 is not provided are equivalent to the opening portions of the pixels PX1 to PX5 (subpixels SR, SG, SB and SW). Note that, as described above, the light-shielding layer 43 is provided at the positions which partition the area into the subpixels SR, SG, SB and SW, but the light-shielding layer 43 used for partitioning of the subpixels SR, SG, SB and SW is omitted in FIG. 8.

As shown in FIG. 8, the light-shielding layer 43 is provided at the positions overlapping the subpixels SR, SG, SB and SW included in the pixel PX1, respectively, so that the aperture ratios of the subpixels SR, SG, SB and SW each are 75%. In the example shown in FIG. 8, the light-shielding layer 43 is provided at positions overlapping an upper 12.5% region and a lower 12.5% region of each of the subpixels SR, SG, SB and SW included in the pixel PX1, and thus the aperture ratio (75%) of the pixel PX1 is realized.

In addition, the light-shielding layer 43 is provided at positions respectively overlapping the subpixels SR, SG, SB and SW included in the pixel PX2 so that the aperture ratios of the subpixels SR, SG, SB and SW each are 50%. In the example shown in FIG. 8, the light-shielding layer 43 is provided at positions overlapping an upper 25% region and a lower 25% region of each of the subpixels SR, SG, SB and SW included in the pixel PX2, and thus the aperture ratio of the pixel PX2 (50%) is realized.

Further, the light-shielding layer 43 is provided at positions respectively overlapping the subpixels SR, SG, SB and SW included in the pixel PX3 so that the aperture ratios of the subpixels SR, SG, SB and SW each are 25%. In the example shown in FIG. 8, the light-shielding layer 43 is provided at positions overlapping an upper 37.5% region and a lower 37.5% region of each of the subpixels SR, SG, SB and SW included in the pixel PX3, and thus the aperture ratio of the pixel PX3 (25%) is realized. This also the case for the pixel PX4.

Further, the light-shielding layer 43 is provided at positions respectively overlapping the subpixels SR, SG, SB and SW included in the pixel PX5 so that the aperture ratios of the subpixels SR, SG, SB and SW each are 0%. Note that the aperture ratio of the pixel PX5 (0%) is realized by providing the light-shielding layer 43 at positions respectively overlapping all the regions of the subpixels SR, SG, SB and SW included in the pixel PX5.

The example shown in FIG. 8 is described on the assumption that the light-shielding layer 43 is provided at positions overlapping the upper and lower regions of the subpixels SR, SG, SB and SW, but the light-shielding layer 43 may be provided at positions overlapping the left and right regions of the subpixels SR, SG, SB and SW. Further, the light-shielding layer 43 may be provided along the boundary portion between each subpixel and a peripheral subpixel adjacent to the subpixel (that is, so as to surround the opening). That is, in this embodiment, if the aperture ratio of the pixel PX (subpixels SR, SG, SB and SW) described above can be realized, the light-shielding layer 43 may be provided at positions different from those of the example shown in FIG. 8 with a shape different from that thereof.

As described above, in this embodiment, each opening of the pixels PX disposed at the edge portion of the non-rectangular display area DA is formed to have a size corresponding to the shape of the display area DA (that is, shielded by the area ratio). In this embodiment, with such a configuration, rattling at the edge portion of the non-rectangular display area DA can be suppressed as compared to, for example, a configuration in which the sizes of the opening portions of all the pixels PX are the same.

Further, this embodiment is configured such that the size of each opening of the pixels PX disposed at the edge portion of the display area DA is less than or equal to the size of each opening of the pixels arranged in the display area DA other than the edge portion. With such a configuration, the brightness can be ensured in the area other than the edge portions of the display area DA, and the boundary portion between the display area DA and the non-display area NDA can be smoothly expressed.

Note that in this embodiment, the light-shielding layer 43 is provided at positions overlapping the pixel PX, and thus the opening portions of the pixels PX disposed at the edge portions of the display area DA can be formed to have a size corresponding to the shape of the display area DA.

Further, for example, when the light-shielding layer 43 is provided as shown in FIG. 6 according to the shape of the display area DA, coloring occurs at the edge portion of the display area DA; however in this embodiment, the opening portions of a plurality of subpixels (for example, subpixels SR, SG, SB and SW) included in the same pixel PX are formed to have the same size. That is, in this embodiment, the size of the openings is determined for each pixel as described above, and with such a configuration, the balance of the area ratio of the opening portions of the subpixels included in the pixel PX can be maintained (that is, shortage of some color components in the pixel PX can be avoided), thus making it possible to avoid the occurrence of the coloring described above.

This embodiment is described in connection with the case where the opening portions of the subpixels SR, SG, SB and SW included in the same pixel PX are formed to have the same size (that is, the size of the opening is adjusted for each pixel). Here, note that the coloring described above may occur when at least one of the color components displayed by the subpixels SR, SG and SB is insufficient, for example. Therefore, when the pixel PX includes the subpixels SR, SG, SB and SW, for example, such a configuration will do that the opening portions of the subpixels SR, SG and SB other than the subpixel SW may have the same size.

Further, this embodiment is described in connection with the case where each of the plurality of pixels PX includes subpixels SR, SG, SB and SW, but such a configuration will do that each of the plurality of pixels PX includes the subpixels SR, SG and SB. Even in the case of such a configuration, it is possible to avoid the occurrence of the coloring by adjusting the size of the opening for each pixel (that is, forming the opening portions of the subpixels SR, SG and SB to have the same size).

Further, the present embodiment may be applied to a configuration including a subpixel that outputs light corresponding to, for example, a yellow wavelength band in place of the subpixel SW included in each of the plurality of pixels PX.

Furthermore, this embodiment is described in connection with the case where the display panel 11 has the pixel array shown in FIG. 4, but the orientation of the row or column of the pixel array may be different, or the row and the column of the pixel array may be interchanged.

Moreover, this embodiment is described on the assumption that the display panel 11 has a rectangular shape, but the display panel 11 may have a shape corresponding to the shape (non-rectangular shape) of the display area DA, for example.

Further, this embodiment is described in connection with the case where the pixels PX are disposed also in the non-display area NDA, for example, and the light-shielding layer 43 is provided at positions overlapping with the pixels PX. However, such a configuration will do that the pixels PX is arranged only in the display area DA, and the openings of the pixels PX disposed at the edge portion of the display area DA are formed as described in this embodiment.

Second Embodiment

Next, the second embodiment will be described. Note that the configuration and the like of the display device according to this embodiment are similar to those of the first embodiment described above, and thus will be described with reference to FIGS. 1 to 3 and the like as appropriate.

Here, the first embodiment provided above is described in connection with an example case where the display panel 11 includes the pixel array shown in FIG. 4, but in this embodiment, the pixel array included in the display panel 11 is different from that of the first embodiment described above.

First, with reference to FIG. 9, the pixel array in this embodiment will be described. FIG. 9 simply shows an array of a plurality of pixels PX arranged on the display panel 11 in this embodiment.

Note that in this embodiment, each of the pixels PX arranged in the display panel 11 includes a plurality of subpixels SR, SG, SB and SW as in the case of the above-described first embodiment. Further, blocks arranged in a matrix in FIG. 9 each represent a subpixel included in a respective pixel PX. Note that a block labeled "R" represents a subpixel SR, a block labeled "G" represents a subpixel SG, a block labeled "B" represents a subpixel SB, and a block labeled "W" represents a subpixel SW, and these points are as shown in FIG. 4 described above.

Here, as shown in FIG. 9, odd-numbered rows (for example, the first row) of the pixel array in this embodiment are each constituted by a plurality of pixels PX arranged along a row direction and including a plurality of subpixels arranged along the row direction. Similarly, even-numbered rows (for example, the second row) of the pixel array in this embodiment are each constituted by a plurality of pixels PX arranged along the row direction and including a plurality of subpixels arranged along the row direction. On the display panel 11, a plurality of pixels PX which constitute such odd rows(, which will be referred to as odd-numbered row pixels PX, hereinafter) and a plurality of pixels PX which constitute even rows(, which will be referred to as even-numbered row pixels PX, hereinafter) are arranged alternately along a column direction.

Further, in this embodiment, the odd-numbered row pixels PX and the even-numbered row pixels PX are arranged so that, for example, subpixels that output light corresponding to a wavelength band of the same color (that is, display the same color) are not to be adjacent to each other along the column direction.

According to such a pixel arrangement, there is an advantage that the resolution can be improved as compared to the case where, for example, the odd-numbered row pixels PX and the even-numbered row pixels PX are arranged such that the subpixels that output light corresponding to the wavelength band of the same color are adjacent to each other along the column direction (that is, the pixel array shown in FIG. 4 described above).

Note that this embodiment will be description on the assumption that the odd-numbered row pixels PX of the pixel array include subpixels SR, SG, SB and SW along the row direction of the pixel array, and the even-numbered row pixels PX of the pixel array include subpixels SB, SW, SR and SG along the row direction of the pixel array. That is, in the pixel array shown in FIG. 9, the odd-numbered row pixels PX and the even-numbered row pixels PX are arranged such that the subpixels SR included in the odd-numbered row pixels PX and the subpixels SB included in the even-numbered row pixels PX are adjacent to each other along the column direction.

Let us suppose here a configuration in which the light-shielding layer 43 is provided at positions overlapping a non-display area NDA of a plurality of pixels PX (subpixels SR, SG, SB and SW) (that is, the portion corresponding to the non-display area NDA is covered by the light-shielding layer 43) in order to form a non-rectangular display area DA shown in FIG. 10 in the pixel array shown in FIG. 9 described above. In the case of such a configuration, color-ing may occur at an edge portion of the display area DA as described with reference to FIG. 6.

Therefore, in this embodiment, to be similar to the above-described first embodiment, each opening portion of the pixels PX disposed at the edge portion of the display area DA (a portion of the pixels PX, which does not overlap the light-shielding layer 43) is formed to have a size corresponding to the shape of the display area DA (that is, light is shielded by the area ratio).

The first embodiment provided above is described in connection the case where the size of the opening is adjusted per each pixel (that is, the opening portions of the subpixels SR, SG, SB and SW included in the same pixel PX have the same size). However, this embodiment will be described on the assumption that, of the subpixels SR, SG, SB and SW included in the pixels PX disposed at an edge portion of the display area DA, the opening portions of some of the subpixels (that is, first subpixels) and the opening portions of the other subpixels (second subpixels) are respectively formed into sizes corresponding to the shape of the display area DA. More specifically, in this embodiment, the size of the opening is adjusted in units of two subpixels of the subpixels SR, SG, SB and SW included in the pixels PX.

Hereinafter, with reference to FIG. 11, the openings of subpixels SR, SG, SB and SW included in the pixels PX disposed at the edge portion of the display area DA, when the display area DA shown in FIG. 10 described above in this embodiment is realized, will be described.

It should be noted that L0 to L4 noted in the blocks each representing each respective subpixel in FIG. 11 are similar to L0 to L4 noted in the blocks representing the respective subpixels in FIG. 7 described above, and each symbol represents the aperture ratio of the respective subpixel.

Let us suppose that the pixels PX1 to PX5 shown in FIG. 11 are disposed at an edge portion of the display area DA. Here, L1 is noted in the blocks respectively representing the subpixels SR and SG included in the pixel PX1, whereas L4 is noted in the blocks respectively representing the subpixels SB and SW included in the pixel PX1. With this configuration, it is indicated that the aperture ratio of each of the subpixels SR and SG included in the pixel PX1 is 25%, and the aperture ratio of each of the subpixels SB and SW included in the pixel PX1 is 100%.

Further, L0 is noted in the blocks respectively representing the subpixels SB and SW included in the pixel PX2, whereas L3 is noted in the blocks respectively representing the subpixels SR and SG included in the pixel PX. With this configuration, it is indicated that the aperture ratio of each of the subpixels SB and SW included in the pixel PX2 is 0%, and the aperture ratio of each of the subpixels SR and SG included in the pixel PX2 is 75%.

Further, L0 is noted in the blocks respectively representing the subpixels SR and SG included in the pixel PX3, whereas L2 is noted in the blocks respectively representing the subpixels SB and SW included in the pixel PX3. With this configuration, it is indicated that the aperture ratio of each of the subpixels SR and SG included in the pixel PX3 is 0%, and the aperture ratio of each of the subpixels SB and SW included in the pixel PX3 is 50%.

Similarly, L0 is noted in the block respectively representing the subpixels SB and SW included in the pixel PX4, whereas L1 is noted in the blocks respectively representing the subpixels SR and SG included in the pixel PX4. With this configuration, it is indicated that the aperture ratio of each of SB and SW included in the pixel PX4 is 0%, and the aperture ratio of each of the subpixels SR and SG included in the pixel PX4 is 25%.

Further, L0 is noted in the blocks respectively representing each of the subpixels SR and SG included in the pixel PX5, whereas L0 is noted in the blocks respectively representing the subpixels SB and SW included in the pixel PX5. With this configuration, it is indicated that the aperture ratio of each of the subpixels SR and SG included in the pixel PX5 is 0% (L0), and the aperture ratio of each of the subpixels SB and SW included in the pixel PX5 is 0%.

As described above, in this embodiment, the aperture ratio is set in units of two subpixels (subpixels SR and SG and subpixels SB and SW). That is, the subpixels SR and SG included in each pixel PX are formed so as to have the same aperture ratio (the same size of the opening), and the subpixels SB and SW included in each pixel PX are formed to have the same aperture ratio (the same size of the opening).

Note that the aperture ratios of the pixels PX adjacent to the right side of the pixels PX1 to PX5 shown in FIG. 11 (that is, the pixels PX arranged in portions other than the edge portions of the display area DA) each are 100% (L4).

Further, in this embodiment, the light-shielding layer 43 is provided (mounted) at positions respectively overlapping the pixels PX1 to PX5 such that the opening portions of the pixels PX1 to PX5 disposed at the edge portions of the display area DA have sizes corresponding to the shape (outline) of the display area DA. Here, the sizes of the openings (that is, the aperture ratios) are determined as follows, for example.

First, when, as shown in FIG. 10 described above, an area in which the plurality of pixels PX are arranged is divided into the display area DA and the non-display area NDA, the ratio occupied by the display area DA that overlaps the region with respect to the region of the subpixels SR and SG included in each pixel PX (, which will be referred to as the display area ratio of the subpixels SR and SG, hereinafter) is specified.

When the display area ratio of the subpixels SR and SG thus specified is, for example, 0% to 12.5%, the aperture ratio of the subpixels SR and SG is set to 0% (that is, L0).

When the display area ratio of the subpixels SR and SG is, for example, 12.5% to 37.5%, the aperture ratio of the subpixels SR and SG is set to 25% (that is, L1).

When the display area ratio of the subpixels SR and SG is, for example, 37.5% to 62.5%, the aperture ratio of the subpixels SR and SG is set to 50% (that is, L2).

When the display area ratio of the subpixels SR and SG is, for example, 62.5% to 87.5%, the aperture ratio of the subpixels SR and SG is set to 75% (that is, L3).

When the display area ratio of the subpixels SR and SG is, for example, 87.5, to 100%, the aperture ratio of the subpixels SR and SG is set to 100% (that is, L4).

Here, the aperture ratios of the subpixels SR and SG included in each pixel PX are as described above, and the aperture ratios of the subpixels SB and SW included in each pixel PX can be determined similarly.

More specifically, when the area in which the plurality of pixels PX are arranged is divided into the display area DA and the non-display area NDA as shown in FIG. 10, the display area ratio of the subpixels SR and SG included in the pixel PX1 is applicable to 12.5% to 37.5%. Therefore, the aperture ratio of the subpixels SR and SG included in the pixel PX1 is set to 25% (L1). On the other hand, the display area ratio of the subpixels SB and SW included in the pixel PX1 is applicable to 100%, and therefore the aperture ratio of the subpixels SB and SW is set to 100% (L4).

Further, the display area ratio of the subpixels SB and SW included in the pixel PX2 is applicable to 0% to 12.5%, and therefore the aperture ratio of the subpixels SB and SW is set to 0% (L0). On the other hand, the display area ratio of the subpixels SR and SG included in the pixel PX2 is applicable to 62.5% to 87.5%, and therefore the aperture ratio of the subpixels SR and SG is set to 75% (L3).

Furthermore, the display area ratio of the subpixels SR and SG included in the pixel PX3 is applicable to 0% to 12.5%, and therefore the aperture ratio of the subpixels SR and SG is set to 0% (L0). On the other hand, the display area ratio of the subpixels SB and SW included in the pixel PX3 is applicable to 37.5% to 62.5%, the aperture ratio of the subpixels SB and SW is set to 50% (L2).

Further, the display area ratio of the subpixels SB and SW included in the pixel PX4 is applicable to 0% to 12.5%, and therefore the aperture ratio of the subpixels SB and SW is set to 0% (L0). On the other hand, the display area ratio of the subpixels SR and SG included in the pixel PX4 is applicable to 12.5% to 37.5%, and therefore the aperture ratio of the subpixels SR and SG is set to 25% (L1).

Further, the display area ratio of the subpixels SR and SG included in the pixel PX5 is applicable to 0% to 12.5%, and therefore the aperture ratio of the subpixels SR and SG is set to 0% (L0). On the other hand, the display area ratio of the subpixels SB and SW included in the pixel PX5 is applicable to 0% to 12.5%, and therefore the aperture ratio of the subpixels SB and SW is set to 0%.

That is, in this embodiment, the size of the opening portions (the aperture ratio) of the subpixels SR and SG and the size of the opening portions (the aperture ratio) of the subpixels SB and SW, included in each of the pixels PX disposed at the edge portions of the display area DA are determined according to the shape (outline) of the display area DA. In this manner, the light-shielding layer 43 can be mounted (that is, the opening is formed) at positions overlapping the subpixels SR, SG, SB and SW included in the pixels PX so as to have the determined sizes of the openings, respectively.

Note that, as in the case of the above-described first embodiment, the correspondence between the display area ratio and the aperture ratio described above is an example, and the correspondence may be appropriately changed. In addition, the correspondence between the display area ratio and the aperture ratio may be determined according to, for example, the performance of the display device 10 (for example, the number of pixels, the pixel arrangement or the like).

Further, this embodiment is described as above in connection with the case where, for example, the aperture ratios of the subpixels SR and SG are determined based on the display area ratios of the subpixels SR and SG. But, the aperture ratio of the subpixels SR and SG may be determined based on the non-display area ratio (that is, the ratio occupied by the non-display area NDA to the regions of the subpixels SR and SG). Note that the same applies to the aperture ratios of the subpixels SB and SW.

Furthermore, the aperture ratios of the subpixels SR and SG and the aperture ratios of the subpixels SB and SW may be determined from a viewpoint other than the display area ratio and the non-display area ratio described above.

Figures 12, 13:
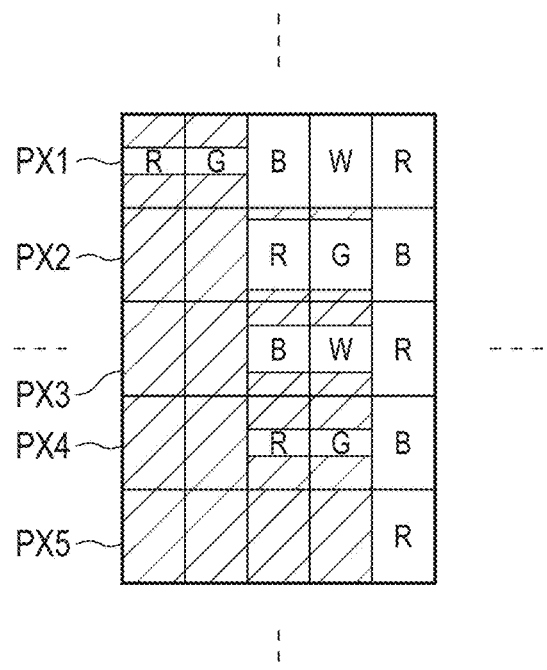
FIG. 12 is a diagram specifically showing the opening portions of the respective subpixels.
FIG. 13 is a diagram showing an edge portion of the display area when the size of openings is adjusted in units of pixels.

Here, FIG. 12 specifically shows the opening of each subpixel formed according to the aperture ratio of each subpixel described in FIG. 11. Note that, in FIG. 12, the shaded portions indicate the portions where the light-shielding layer 43 is provided, and the portions where the light-shielding layer 43 is not provided are equivalent to the opening portions of the subpixels SR, SG, SB and SW. Although the light-shielding layer 43 is provided at the position of partitioning the area into the subpixels SR, SG, SB and SW, the light-shielding layer 43 for the partitioning of the subpixels SR, SG, SB and SW is omitted in FIG. 12.

As shown in FIG. 12, the light-shielding layer 43 is provided at positions respectively overlapping the subpixels SR and SG included in the pixel PX1 such that the aperture ratios of the subpixels SR and SG each are 25%. In the example shown in FIG. 12, the light-shielding layer 43 is provided at positions respectively overlapping an upper 37.5% region and a lower 37.5% region of the subpixels SR and SG included in the pixel PX1, and thus the aperture ratio (25%) of the subpixels SR and SG is realized. On the other hand, the aperture ratios of the subpixels SB and SW included in the pixel PX1 each are 100%, only the minimum necessary light-shielding layer 43 is provided at positions respectively overlapping the subpixels SB and SW.

Further, the light-shielding layer 43 is provided at positions respectively overlapping of the subpixels SB and SW included in the pixel PX2 such that the aperture ratios of the subpixels SB and SW each are 0%. Note that the aperture ratio (0%) of the subpixels SB and SW included in the pixel PX2 is realized by providing the light-shielding layer 43 at positions overlapping all the regions of the subpixels SB and SW. On the other hand, the light-shielding layer 43 is provided at positions respectively overlapping the subpixels SR and SG included in the pixel PX2 such that the aperture ratios of the subpixels SR and SG each are 75%. Note that, in the example illustrated in FIG. 12, the light-shielding layer 43 is provided at positions overlapping an upper 12.5% region and a lower 12.5% region of the subpixels SR and SG included in the pixel PX2. Thus, the aperture ratio (75%) of the subpixels SR and SG is realized.

Further, the light-shielding layer 43 is provided at positions respectively overlapping the subpixels SR and SG included in the pixel PX3 such that the aperture ratios of the subpixels SR and SG each are 0%. On the other hand, the light-shielding layer 43 is provided at positions respectively overlapping the subpixels SB and SW included in the pixel PX3 such that the aperture ratios of the subpixels SB and SW each are 50%. In the example shown in FIG. 12, the light-shielding layer 43 is provided at positions overlapping an upper 25% region and a lower 25% region of the subpixels SB and SW included in the pixel PX3. Thus, the aperture ratio (50%) of the subpixels SB and SW is realized.

The light-shielding layer 43 is provided at positions respectively overlapping the subpixels SB and SW included in the pixel PX4 such that the aperture ratios of the subpixels SB and SW each are 0%. On the other hand, the light-shielding layer 43 is provided at positions respectively overlapping the subpixels SR and SG included in the pixel PX4 such that the aperture ratios of the subpixels SR and SG each are 25%. Note that, in the example illustrated in FIG. 12, the light-shielding layer 43 is provided at positions overlapping an upper 37.5% region and a lower 37.5% region of the subpixels SR and SG included in the pixel PX4. Thus, the aperture ratio (25%) of the subpixels SR and SG is realized.

Further, the light-shielding layer is provided at positions respectively overlapping the subpixels SR and SG included in the pixel PX5 such that the aperture ratios of the subpixels SR and SG each are 0%. Similarly, the light-shielding layer 43 is provided at positions respectively overlapping the subpixels SR and SG included in the pixel PX5 such that the aperture ratios of the subpixels SB and SW each are 0%.

Note that the position where the light-shielding layer 43 is provided and the shape of the light-shielding layer 43 shown in FIG. 12 are examples. That is, as in the case of the first embodiment described above, as long as the aperture ratios of the subpixels SR, SG, SB and SW can be realized, the light-shielding layer 43 may be provided in positions different from those of the example shown in FIG. 12 in different shapes.

As described above, in this embodiment, of the subpixels SR, SG, SB and SW (a plurality of subpixels) included in the pixels PX disposed at an edge portion of the non-rectangular display area DA, the opening portions of two subpixels SR and SG (first subpixels) and the opening portions of the other two subpixels SB and SW (second subpixels) are each formed to have a size corresponding to the shape of the display area DA (shielded by the area ratio).

In this embodiment, with such a configuration, rattling at the edge portions of the non-rectangular display area DA can be suppressed as compared to, for example, a configuration in which the sizes of the opening portions of all the pixels PX are the same.

Here, FIG. 13 shows an edge portion of the display area DA in a wider range than that of FIG. 8 when the size of the opening is adjusted per each pixel as described in the first embodiment provided above. On the other hand, FIG. 14 shows an edge portion of the display area DA in a wider range than that of FIG. 12 when the size of the opening is adjusted in units of two subpixels described in this embodiment.

Figures 14, 15:
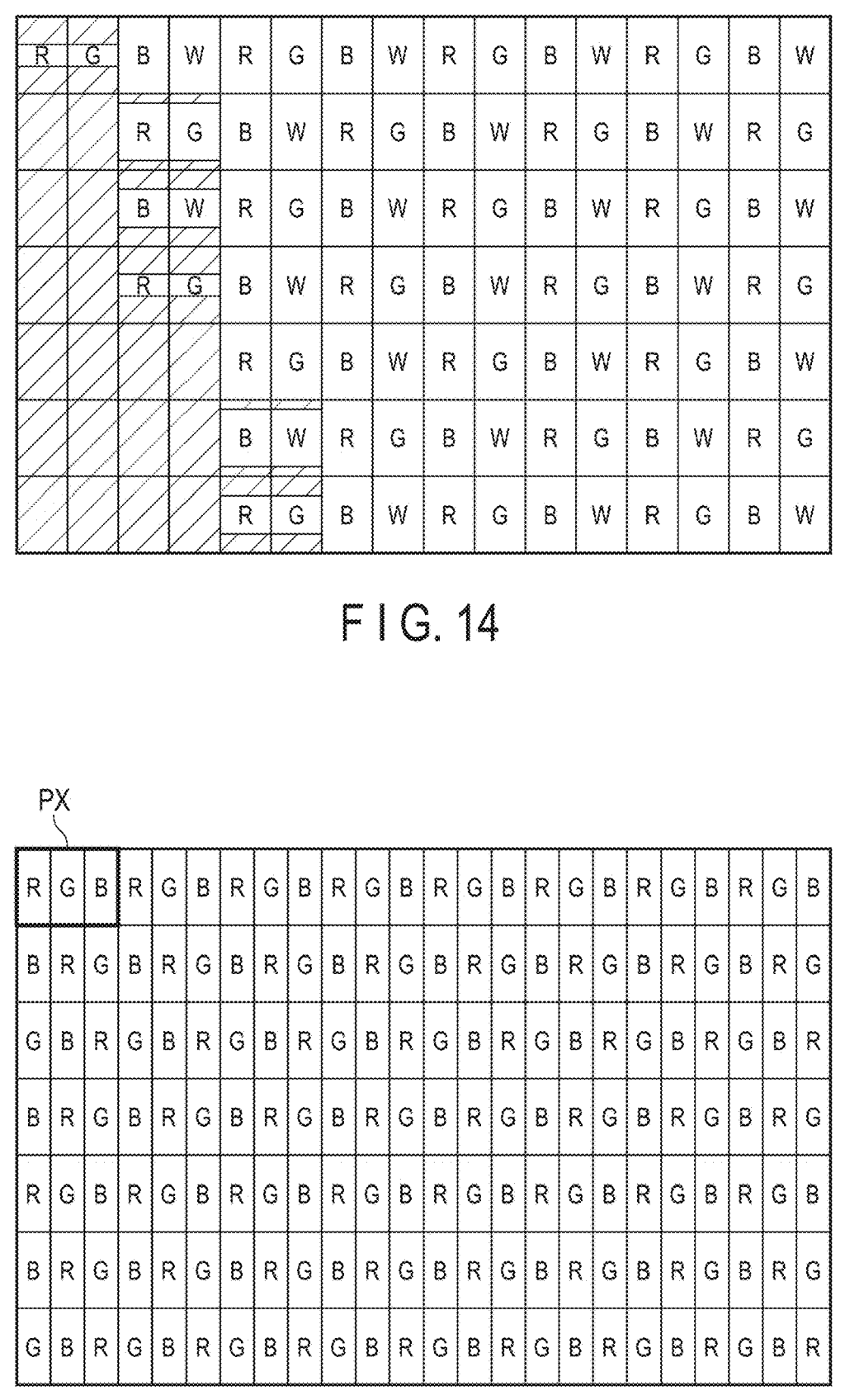

As shown in FIGS. 13 and 14, in this embodiment, the size of the opening is adjusted in units smaller than the pixel PX (in units of two subpixel), and therefore, as compared to the first embodiment, the boundary portion (non-rectangular portion) between the display area DA and the non-display area NDA can be expressed more smoothly.

Note that in the first embodiment described above, the size of the opening is adjusted per each pixel PX (that is, the opening portions of the subpixels SR, SG, SB and SW are formed to have the same size). Thus, the balance of the area ratios of the opening portions of the subpixels included in the pixel PX can be maintained, and the occurrence of coloring in the display area DA can be avoided.

On the other hand, in this embodiment, the size of the opening is adjusted in units of two subpixels, and therefore, unlike the first embodiment described above, the area ratio of the openings of the subpixels included in the pixel PX is off-balanced (that is, the sizes of the opening portions of the subpixels SR and SG and the opening portions of the subpixels SB and SW are different with respect to each other), coloring may occur undesirably at the edge portions of the display area DA.

However, in this embodiment, as described with reference to FIG. 9 described above, a plurality of pixels PX (first pixels) which constitute an odd-numbered row (a first row) of the pixel array and a plurality of pixels PX (second pixels) which constitute an even-numbered row (a second row) of the pixel array are arranged such that subpixels that display the same color (subpixels that output light corresponding to the same wavelength band) do not adjoin to each other along the column direction of the pixel array.

According to such a pixel array, even when the opening portions of the subpixels SR and SG are smaller than the opening portions of the subpixels SB and SW as in the pixel PX1 shown in FIG. 12, for example, it is still possible to complement the color to be expressed in the subpixels SR and SG by the peripheral pixels PX (subpixels SR and SG). Therefore, the occurrence of coloring at an edge portion of the display area DA described above can be suppressed (that is, the degree that a biased hue is visually recognized can be reduced).

This embodiment may be applied to a configuration in which a plurality of pixels PX including subpixels SR, SG and SB are arranged on the display panel 11. More specifically, in the case shown in, for example, FIG. 15, a plurality of pixels PX which constitute odd-numbered rows and a plurality of pixels PX which constitute even-numbered rows are arranged such that subpixels displaying the same color are arranged so as not to be adjacent to each other along the column direction of the pixel array. In this case, the sizes of the openings can be adjusted in units of two adjacent subpixels of the subpixels SR, SG and SB included in each of the plurality of pixels PX. Thus, for example, the opening portions of the subpixels SR and SG included in a pixel PX, and the opening portions of the subpixel SB included in the pixel PX and the subpixel SR included in a pixel PX adjacent to the pixel PX along the row direction (that is, the subpixel SR adjacent to the subpixel SB, respectively) each can be formed to have a size corresponding to the shape of the display area DA. With such a configuration, even in the case where the plurality of pixels PX include the subpixels SR, SG and SB, the boundary portion between the display area DA and the non-display area NDA can be smoothly expressed as described above. Further, it is possible to suppress the occurrence of coloring at the edge portions of the display area DA.

Further, this embodiment is described in connection with the case where the size of the opening is adjusted in units of two subpixels. But, even in the case of the pixel array shown in FIG. 9, as described in the first embodiment provided above, for example, the opening portions of the subpixels SR, SG and SB other than the subpixel SW may be formed to have the same size. In other words, the sizes of the openings may be adjusted in units of subpixels SR, SG and SB and per each subpixel SW, which are included in the pixels PX.

Figure 16:
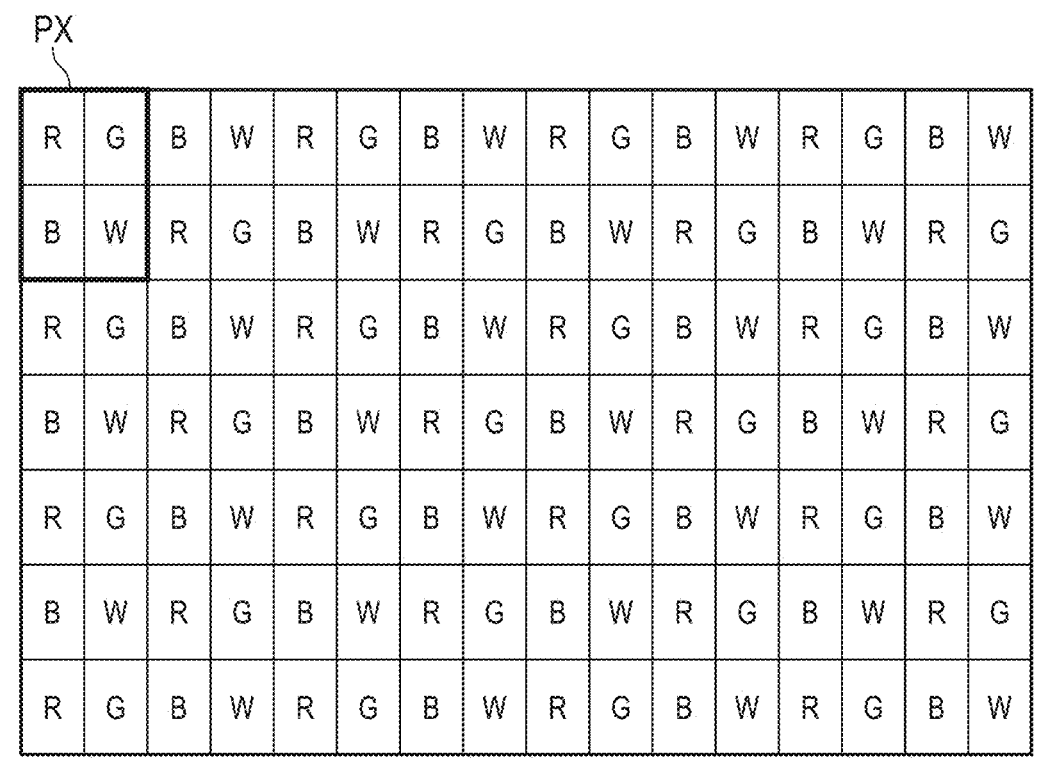

Further, this embodiment is described in connection the case where each of the plurality of pixels PX includes a plurality of subpixels arranged along the row direction, but each of the plurality of pixels PX may be configured to include the subpixels SR, SG, SB and SW arranged as shown in FIG. 16. Even when the subpixels included in the plurality of pixels PX are arranged as shown in FIG. 16, the sizes of the openings can be adjusted in units of two subpixels (subpixels SR and SG and subpixels SB and SW) as described above. Note that, when the subpixels included in the plurality of pixels PX are arranged as shown in FIG. 16, the sizes of the openings can as well be adjusted per each pixel as described in the first embodiment.

Further, this embodiment is described in connection with the case where each of the plurality of pixels PX includes the subpixels SR, SG, SB and SW, but the present embodiment may be applied to a configuration including a subpixel that outputs light corresponding to, for example, a yellow wavelength band in place of the subpixel SW.

Furthermore, this embodiment is described in connection with the case where the display panel 11 includes the pixel array shown in FIG. 9, but the orientation of the row or the column of the pixel array may be different, or the row and the column may be interchanged.

Further, the display panel 11 in this embodiment may have a shape corresponding to the shape (non-rectangular shape) of the display area DA, for example.

Further, in this embodiment, the plurality of pixels PX may be arranged only in the display area DA.

Hereinafter, the invention according to the present embodiments will be additionally noted.

[C1]
A display device including:
a display panel including a plurality of pixels arranged in a non-rectangular display area; and
a display controller configured to display images in the display area, wherein
an opening portion of each of pixels disposed at an edge portion of the display area is light-shielded at an area ratio according to a shape of the display area.

[C2]
The display device of item [C1], further including: a light-shielding layer provided at a position overlapping with the pixels so as to light-shield the opening portion of each the pixels disposed at the edge portion of the display area at the area ratio according to the shape of the display area.

[C3]
The display device of item [C1], wherein
the opening portion of each of the pixels disposed at the edge portion of the display area is light-shielded at an area ratio corresponding to a ratio occupied by the display area overlapping the area of the pixel, with respect to the area of the pixel.

[C4]
The display device of any one of items [C1] to [C3], wherein
each of the plurality of pixels includes a plurality of subpixels that output light corresponding to wavelength bands of colors different from each other, and
the opening portion of each of the plurality of subpixels included in the same pixel of the plurality of pixels are formed to be light-shielded at the same area ratio.

[C5]
The display device of item [C4], wherein
the plurality of subpixels include a subpixel that outputs light corresponding to a red wavelength band, a subpixel that outputs light corresponding to a green wavelength band, a subpixel that outputs light corresponding to a blue wavelength band, and a subpixel that outputs light corresponding to a white wavelength band.

[C6]
The display device of any one of items [C1] to [C3], wherein
each of the plurality of pixels includes a subpixel that outputs light corresponding to a red wavelength band, a subpixel that outputs light corresponding to a green wavelength band, a subpixel that outputs light corresponding to a blue wavelength band and a subpixel that outputs light corresponding to a white wavelength band, and
opening portions of the subpixel that outputs light corresponding to the red wavelength band, the subpixel that outputs light corresponding to the green wavelength band and the subpixel that outputs light corresponding to the blue wavelength band, included in the same pixel of the plurality of pixels, are formed to be light-shielded at a same area ratio.

[C7]
The display device of any one of items [C1] to [C3], wherein
each of the plurality of pixels includes a plurality of subpixels that output light corresponding to wavelength bands of colors different from each other,
the plurality of pixels include a plurality of first pixels which constitute a first row of the pixel array and a plurality of second pixels which constitute a second row adjacent to the first row in a pixel array along a column direction,
the plurality of first pixels and the plurality of second pixels are arranged alternately along the column direction of the pixel array so as to avoid subpixels that output light corresponding to a wavelength band of the same color from adjoining to each other along the column direction of the pixel array, and opening portions of the first subpixels and opening portions of the second subpixels of the plurality of subpixels included in pixels disposed at the edge portion of the display area are light-shielded at respective area ratios according to the shape of the display area.

[C8]

The display device of item [C7], wherein the first subpixels include a subpixel that outputs light corresponding to the red wavelength band and a subpixel that outputs light corresponding to the green wavelength band, adjacent to each other, of the plurality of subpixels arranged along the row direction in pixels disposed at the edge portion of the display area, and the second subpixels include a subpixel that outputs light corresponding to the blue wavelength band and a subpixel that outputs light corresponding to the white wavelength band, adjacent to each other, of the plurality of the subpixels arranged along the row direction in the pixels disposed at the edge portion of the display area.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    a display panel comprising a plurality of pixels arranged in a non-rectangular display area; and
    a display controller configured to display images in the display area, wherein
    the plurality of pixels include a plurality of first pixels which constitute a first row of the pixel array and a plurality of second pixels which constitute a second row adjacent to the first row in a pixel array along a column direction,
    each of the plurality of first pixels includes first and second subpixels,
    each of the plurality of second pixels includes the first and second subpixels,
    the plurality of first pixels and the plurality of second pixels are arranged alternately along the column direction of the pixel array,
    opening portions of the first and second subpixels included in the first and second pixels disposed at the edge portion of the display area are light-shielded at respective area ratios according to the shape of the display area,
    the size of the light-shielded area of the first subpixel included in the first pixel is different from the size of the light-shielded area of the second subpixel included in the first pixel,
    the size of the light-shielded area of the first subpixel included in the second pixel is different from the size of the light-shielded area of the second subpixel included in the second pixel, and
    the size of the light-shielded area of the first subpixel included in the first pixel is different from the size of the light-shielded area of the second subpixel which is included in the second pixel and adjoins to the first subpixel included in the first pixel along the column direction of the pixel array.

2. The display device of claim 1, wherein the first subpixels include a subpixel that outputs light corresponding to the red wavelength band and a subpixel that outputs light corresponding to the green wavelength band, adjacent to each other, of the plurality of subpixels arranged along the row direction in pixels disposed at the edge portion of the display area, and the second subpixels include a subpixel that outputs light corresponding to the blue wavelength band and a subpixel that outputs light corresponding to the white wavelength band, adjacent to each other, of the plurality of the subpixels arranged along the row direction in the pixels disposed at the edge portion of the display area.

3. The display device of claim 1, further comprising a light-shielding layer provided at a position overlapping with the pixels so as to light-shield the opening portion of each of the first and second subpixels included in the first and second pixels disposed at the edge portion of the display area at the area ratio according to the shape of the display area.

4. The display device of claim 1, wherein the opening portion of each of the first and second subpixels included in the first and second pixels disposed at the edge portion of the display area is light-shielded at an area ratio corresponding to a ratio occupied by the display area overlapping the area of the pixel, with respect to the area of the pixel.

* * * * *